United States Patent
Binder et al.

(10) Patent No.: US 6,206,488 B1
(45) Date of Patent: Mar. 27, 2001

(54) METHOD AND APPARATUS FOR CONTROLLING A BRAKING SYSTEM

(75) Inventors: Juergen Binder, Stuttgart; Eberhardt Schunck, Landau; Juergen Hachtel, Moeckmuehl; Ulrich Gottwick, Stuttgart, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/126,314

(22) Filed: Jul. 30, 1998

(30) Foreign Application Priority Data

Aug. 1, 1997 (DE) .............................. 197 33 379

(51) Int. Cl.$^7$ ...................................... B60T 8/88
(52) U.S. Cl. ................. 303/122.04; 303/DIG. 9; 701/76
(58) Field of Search ............... 303/DIG. 9, 122.04, 303/122.05, 122.08, 9.63; 701/76, 92, 96

(56) References Cited

U.S. PATENT DOCUMENTS

| | | | |
|---|---|---|---|
| 4,740,778 | * 4/1988 | Harding et al. | 340/635 |
| 5,281,012 | 1/1994 | Binder et al. | 303/113.5 |
| 5,493,495 | * 2/1996 | Naito et al. | 364/426.02 |
| 5,588,719 | * 12/1996 | Bailleux | 303/122.04 |
| 5,735,583 | * 4/1998 | Katayama et al. | 303/122.05 |
| 5,757,641 | * 5/1998 | Minto | 364/133 |
| 5,899,540 | * 5/1999 | Burgdorf et al. | 303/122.08 |
| 5,954,407 | * 9/1999 | Schramm et al. | 303/155 |

FOREIGN PATENT DOCUMENTS

WO 95/13946   5/1995   (WO).

OTHER PUBLICATIONS

Wolf–Dieter Jonner, et al., "Electrohydraulic Brake System—The First Approach To Brake–By–Wire Technology", SAE Paper 960991.

* cited by examiner

Primary Examiner—Michael Mar
Assistant Examiner—Xuan Lan Nguyen
(74) Attorney, Agent, or Firm—Kenyon & Kenyon

(57) ABSTRACT

A method and an apparatus for controlling a braking system, the control unit of which controls the wheel brakes receiving reference variables for control purposes. If these reference variables are not available, the control unit produces, on the basis of a predefined braking force distribution between the front and rear axles and in the context of an emergency mode, reference variables which it sets at the wheel brakes.

12 Claims, 2 Drawing Sheets

METHOD AND APPARATUS FOR CONTROLLING A BRAKING SYSTEM

FIELD OF THE INVENTION

The present invention relates to a method and an apparatus for controlling a braking system.

BACKGROUND INFORMATION

A system for controlling a braking system is known, for example, from SAE Paper 960991, "Electrohydraulic Brake System—The First Approach to Brake-by-Wire Technology", which describes an electrohydraulic braking system in which an electronic control unit is added onto a hydraulic unit that comprises the hydraulic control components of the braking system. This electronic unit performs control actions on the pressures in the individual wheel brakes as a function of setpoints, and reads measured variables which are related to the wheel brakes, such as wheel brake pressure, wheel speeds, etc. This added-on control unit is connected via a communication system to a second control unit in which the vehicle-specific functions are calculated. These are understood to be, primarily, determination of the setpoints for control actions on the individual wheel brakes, e.g. pressure setpoints, reference braking forces, or torque setpoints. These setpoints are calculated from the driver's braking input, taking into consideration a predefined braking force distribution between the front and rear axles of the vehicle, and optionally taking into consideration wheel- and vehicle-related functions such as braking force distribution as a function of transverse force, antilock braking control, automatic slip control, vehicle dynamics control, etc. If this second control unit, or the communication system between the two control units by means of which setpoints and measured values are exchanged, should fail, satisfactory functioning of the braking system can no longer be maintained in all operating situations.

International Published Patent Application No. WO 95/13946 describes a control system for a braking system which has a central module as well as brake modules associated with braking circuits or wheel groups. The brake modules sense the wheel-specific variables such as wheel speed and braking pressure. One of the brake modules, preferably the one for the front axle, furthermore senses an indicator for the driver's pedal actuation. The sensed values are conveyed via a communication system to the central module, which determines, at least from the operating variables that are delivered, setpoints for the individual wheel brakes. These setpoints are delivered by the communication system to the brake modules for implementation. If the central module fails, the brake module which reads in the actuation signal takes over the determination of setpoints for the wheel brakes in the context of an emergency mode, and adjusts the brakes associated with it accordingly and transmits the setpoints to further brake modules via the communication system. No description is given of a concrete embodiment of the emergency mode, or of a control system for all wheel brakes in the event of failure of the communication system.

German Published Patent Application No. 41 12 388 (corresponding to U.S. Pat. No. 5,281,012) describes a controller for braking force distribution between the front and rear axles. In this system, the braking force distribution is implemented, on the basis of the wheel speed signals, in such a way that the speed difference between the front and rear wheels does not exceed a predetermined threshold value.

SUMMARY OF THE INVENTION

It is therefore an object of the present invention to indicate measures which maintain satisfactory operation of the braking system even in the event of failure of the second control unit or of the communication system between the two control units.

Advantageously, in the case of a control system of a braking system which comprises at least two control units, a satisfactory emergency mode is made available in the event of failure of the higher-level control unit and/or of the communication system between that higher-level control unit and the control unit performing the actual brake regulation.

It is particularly advantageous that even in the event of a fault, braking force distribution between the front and rear axles is guaranteed, effectively preventing overbraking of the rear wheels, i.e. locking of the rear wheels, without locking the front wheels.

It is particularly advantageous that the vehicle stability for vehicles in emergency mode corresponds to that of vehicles without an antilock braking system.

It is furthermore advantageous that the availability of the braking control system is considerably increased; even in the emergency mode, additional hydraulic components (such as braking pressure reducers) can be dispensed with, since braking force distribution is regulated electronically.

DETAILED DESCRIPTION

Figure 1:
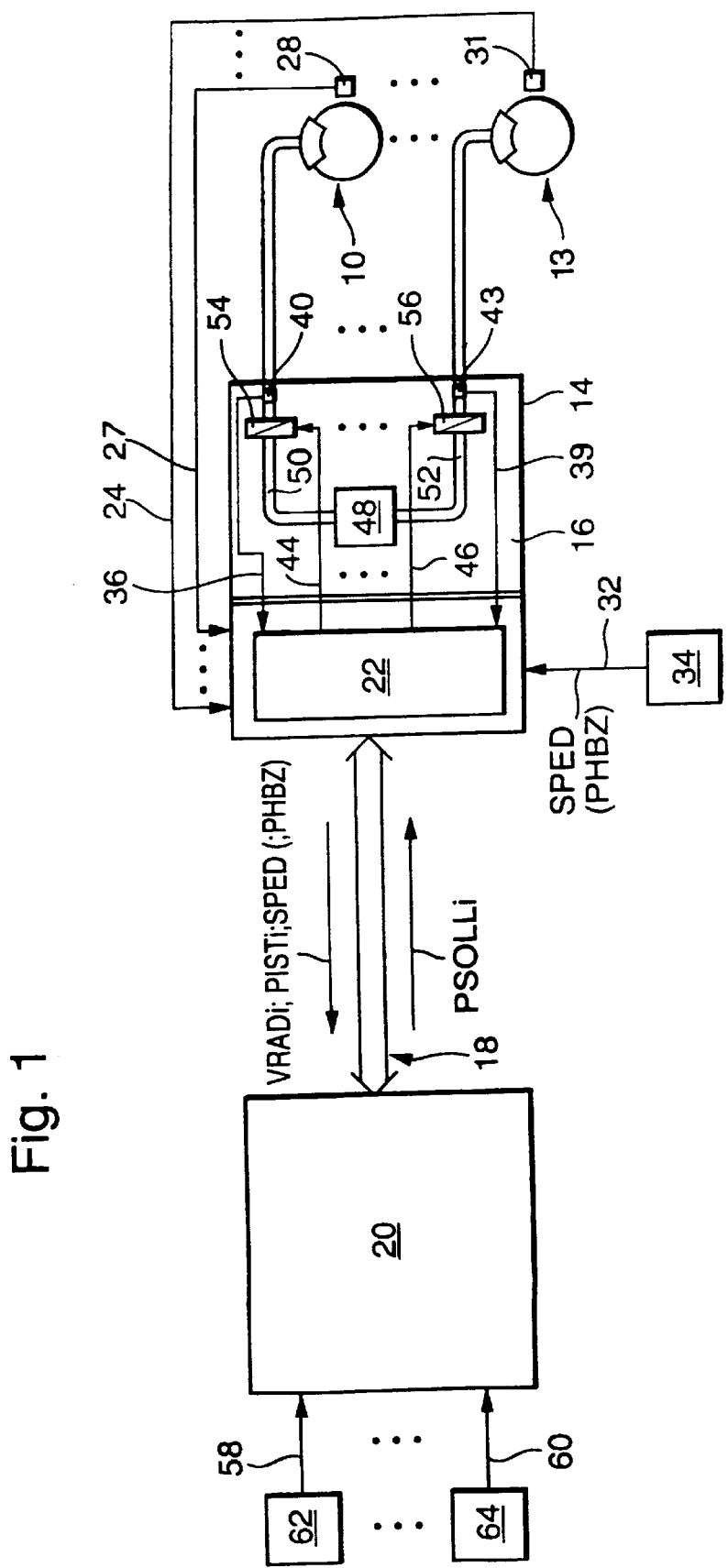
FIG. 1 shows a synoptic block diagram of an electrically controlled braking system according to the present invention.

FIG. 1 shows a synoptic block diagram of a control system for an electrically controllable hydraulic braking system in an exemplary embodiment of the present invention. The braking system is depicted in exemplary fashion with reference to two selected wheel brakes 10 and 13. Also depicted is a hydraulic unit 14 which comprises the hydraulic control element of the braking system. Added onto this hydraulic unit 14 is a first control unit 16 which is connected via a communication system 18, in particular a serial interface using the well known controller are network ("CAN") protocol, to a second control unit 20 called the "vehicle coordinator." The first control unit 16 includes at least one microcomputer 22 which senses and analyzes the signal variables conveyed via the input lines. It also makes available output variables which are provided in order to activate the hydraulic control means and/or for transfer to second control unit 20. At least the following input lines are conveyed to first control unit 16: input lines 24 to 27 from wheel speed sensors 28 to 31 associated with wheel brakes 10 to 13; input lines 36 to 39 from pressure sensors 40 to 43 which, in the region of hydraulic unit 14, sense the braking pressure present in the wheel brake line and thus in the wheel brake cylinder; and an input line 32 from a measurement device 34 which senses an indicator for actuation of the brake pedal by the driver, which corresponds to the pedal travel SPED and/or the actuation force PHBZ (master brake cylinder pressure, torque, etc.). Control unit 16 is also supplied, via communication connection 18, with data from control unit 20, and in particular, with setpoints PSOLLi to control the individual wheel brakes. These setpoints PSOLLi represent the braking force to be set at the individual wheel brake, the braking torque to be set, the braking pressure to be set, the wheel speed to be set, the slip to be set, etc. Control unit 16 also has output lines 44 to 46 by means of which the valve arrangement influencing the braking force at each individual wheel brake, and an electrically controllable pressure source (e.g., a pump) are activated. Control unit 16 moreover delivers to control unit 20, via communication system 18, the measured variables sensed by it, such as wheel speeds VRADi, braking pressures (or braking torques, braking forces) PISTi, and brake pedal actuation variables SPED and/or PHBZ.

Hydraulic unit 14 is merely sketched in FIG. 1 for reasons of clarity. The hydraulic unit, depicted using the example of two wheel brakes 10, 13, consists substantially of an electrically controlled pressure source 48, which optionally also can be influenced by the driver by actuation of the brake pedal, from which substantially two brake lines 50 and 52 lead via electrically activatable valve arrangements 54 and 56 to wheel brakes 10 and 13. A concrete embodiment of hydraulic unit 14 is described in the existing art cited earlier (SAE Paper 960991).

Control unit 20, the so-called vehicle coordinator, serves to perform the vehicle-specific functions such as antilock braking, automatic slip control, vehicle dynamics system, braking force distribution control, etc. For this purpose, the measured variables sensed by control unit 16 are conveyed to the control unit via communication system 18. Further operating variables such as transverse acceleration, steering angle, yaw rate, etc., which are analyzed during the performance of these functions, are conveyed to control unit 20 from measurement devices 62 to 64 via further input lines 58 to 60. As output variables, control unit 20 delivers to control unit 16, via communication system 18, reference variables for setting the setpoints for braking force (or braking torque, braking pressure, etc.) determined on the basis of driver input and optionally of further functions.

In normal mode, control unit 16 (microcomputer 22 therein) senses the signal variables conveyed to it, processes them, and sends them for further processing, via communication system 18, to control unit 20 (the vehicle coordinator). The latter, in the context of procedures known from the existing art, produces the driver's braking input from the conveyed variables, in particular from the brake pedal actuation variable. Determination of the braking input can also take place in control unit 16, which then delivers the defined driver's braking input via communication system 18 to control unit 20. In control unit 20, setpoints for the vehicle's wheel brakes are then determined from the braking input defined by the driver, by means of the functions calculated therein—such as antilock braking, automatic slip control, and/or vehicle dynamics control—and by performing a braking force distribution control action between the individual wheels of the front and rear axles. In the exemplary embodiment of the present invention, these setpoints represent reference braking pressures for the individual wheel brakes; in other exemplary embodiments they represent reference braking forces, reference torques, reference wheel speeds, or slip setpoints. These reference variables are in turn transferred via the communication system to control unit 16. Provided therein for each electrically controlled wheel is a control loop in the context of which the corresponding actual value at the wheel is adjusted to the setpoint predefined for that wheel. In the exemplary embodiment of the present invention, pressure control loops are provided which implement the braking pressure in the wheel brakes 10,13 in accordance with the reference braking pressures. In other exemplary embodiments, braking force control loops, braking torque control loops, wheel speed control loops, or slip control loops are provided; in the case of the first two solutions, the corresponding actual value (braking force or braking torque) is measured or estimated from the available variables instead of or in addition to the actual braking pressure.

The setpoint parameters of control unit 20 are checked in control unit 16 by comparing them to one another; if there are impermissible deviations, a fault condition is detected. In that case an emergency mode is initiated and results, for example, in deactivation of control unit 20 and control of the brakes by control unit 16, as described below.

If vehicle coordinator 20 or communication system 18 fails, an emergency mode for the braking control system is initiated. In this emergency mode, control unit 16 (which is now the only one functional) activates the wheel brakes 10, 13 so as at least partly to maintain brake control. For this purpose, control unit 16 (microprocessor 22 therein) produces a setpoint for each wheel from the driver's braking input determined via the input signals. In order essentially to maintain vehicle stability and prevent overbraking of the rear axle, a fixed braking force distribution between the front and rear axles is, for example, set in the context of the emergency mode. In another exemplary embodiment, a different braking force distribution, e.g. an ideal braking force distribution or a distribution indicating a fault, is defined. This braking force distribution is selected so that the front-wheel brakes always reach locking level first. The braking force distribution characteristic curve for the emergency mode depends on the vehicle model, and is adapted for each vehicle model. It is used only if the vehicle coordinator 20 is defective, or if transmission errors occur between vehicle coordinator 20 and control unit 16. In this emergency mode, the vehicle-specific functions such as antilock braking, automatic slip control, and/or vehicle dynamics control or braking force distribution control, which are calculated in the vehicle coordinator 20, are deactivated.

If the driver's braking input is calculated in vehicle coordinator 20, in emergency mode a corresponding procedure is used in control unit 16. The latter then determines the braking input from the driver stipulations, and then directly calculates the braking force to be set. With this emergency setpoint, the front and rear wheel brake setpoints (preferably reference pressures) are determined on the basis of the predefined braking force distribution characteristic curves. To maintain the predefined distribution, a braking force distribution controller is additionally provided in control unit 16 and directly sets the rear axle braking pressure on the basis of the wheel speeds, as defined by the existing art cited initially, in such a way that a predefined difference between the front-wheel and rear-wheel speeds is not exceeded.

In an exemplary embodiment of the present invention, control units 16 and 20 are geographically separated in the vehicle. Control unit 16 is added onto hydraulic unit 14, and constitutes a so-called add-on control device (ASG). The vehicle coordinator is implemented in its own control device which is arranged anywhere in the vehicle (remotely located control device, WSG). In another exemplary embodiment, both control units can be implemented in one control device, for example in two microcomputers separated from one another, or in two program blocks separated from one another. In this case the procedure set forth above in the event of a fault in the vehicle coordinator 20 or the transmission means is utilized accordingly.

An implementation of the procedure set forth above is represented by a corresponding program of the microcomputer of control unit 16. An example is outlined with reference to the flow chart in FIG. 2. The program outlined there is initiated at predefined points in time. In the first step 100, the conveyed measured variables of wheel speeds VRADi, actual values (preferably braking pressures PISTi), brake pedal actuation variables SPED, PHBZ, etc. are sensed; the driver's braking input is determined, if applicable, from the driver stipulations. In the subsequent query step 102, a check is made on the basis of transmission protocols and/or fault flags, in the manner known from the existing art, as to whether control unit 20, i.e. the vehicle coordinator, and the communication connection 18 between control unit 16 and control unit 20 are operational. If so, the control system is operated in normal mode. This means that as defined by step 104, control unit 16 delivers to control unit 20, via the communication connection 18, the processed measured variables VRADi, PISTi, and SPED (and/or PHBZ or the braking input that has been determined). In the next step 106, control unit 16 receives from vehicle coordinator 20 the setpoints PSOLLi for the individual wheel brakes 10, 13, which correspond to pressure setpoints. These were determined by vehicle coordinator 20 on the basis of the conveyed measured variables as well as further, vehicle-specific variables. After step 106, in the subsequent step 108 the valve activation signals are determined for each wheel, in the context of control loops for each individual wheel, on the basis of the respective reference variable and the respective actual value. The valve activation signals are then, as defined by step 110, output to the corresponding valve arrangement and in this manner the corresponding actual value is adjusted to the predefined setpoint. After step 110 the program is terminated, and is initiated again at the next point in time.

Figure 3:
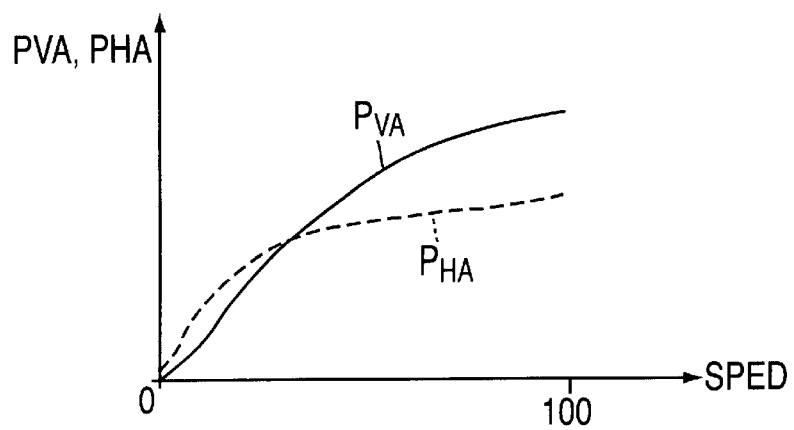
FIG. 3 shows a diagram for an exemplary system for distributing braking force between the front and rear axles which could be used in the emergency mode of the braking system control system of the present invention.

If step 102 has indicated that either vehicle coordinator 20 or communication connection 18 is defective, the emergency mode is initiated. For this purpose, if it has not already been done in step 100, the driver's braking input is determined from driver stipulations SPED and/or PHBZ. This is also referred to, for the sake of simplicity, as SPED. In addition, suitable characteristic curves, which will reliably prevent overbraking of the rear axle, are predefined for the braking force distribution between the front and rear axles. An example is depicted in FIG. 3, where the driver's braking input SPED (from 0 to 100%) is plotted on the horizontal axis, while the braking forces (braking pressures) at the front axle PVA and at the rear axle PHA are plotted on the vertical axis. The braking force at the front-wheel brakes rises more sharply, at least with greater pedal travels, at the front-wheel brakes than at the rear-wheel brakes, so that in all instances the front-wheel brakes will tend to lock first. This reliably prevents overbraking of the rear axle.

In another exemplary embodiment, a linear correlation between PVA and PHA is selected. In addition, different braking force distributions are set, for example, if the intention is to notify the driver that the braking system is not in good order. In that case no braking forces are built up in the first few % of SPED, so that the driver is informed of emergency mode not only by the usual warning lights, but also by a change in the delay characteristic of the braking input SPED.

In the exemplary embodiment of the present invention, a braking force distribution controller which maintains the predefined braking force distribution is also provided. This braking force distribution controller is constructed in a manner known from the existing art. With this, the rear wheel speeds are set in such a way that the speed of the rear wheels, preferably of the slowest rear wheel, does not exceed the speed of the front wheels, preferably of the fastest front wheel, by more than a specific amount.

In another exemplary embodiment, the control system is implemented on the basis of slip values of the front axle wheels and the rear axle wheels, the slip values being allowed to differ only by a predetermined amount.

Figure 2:
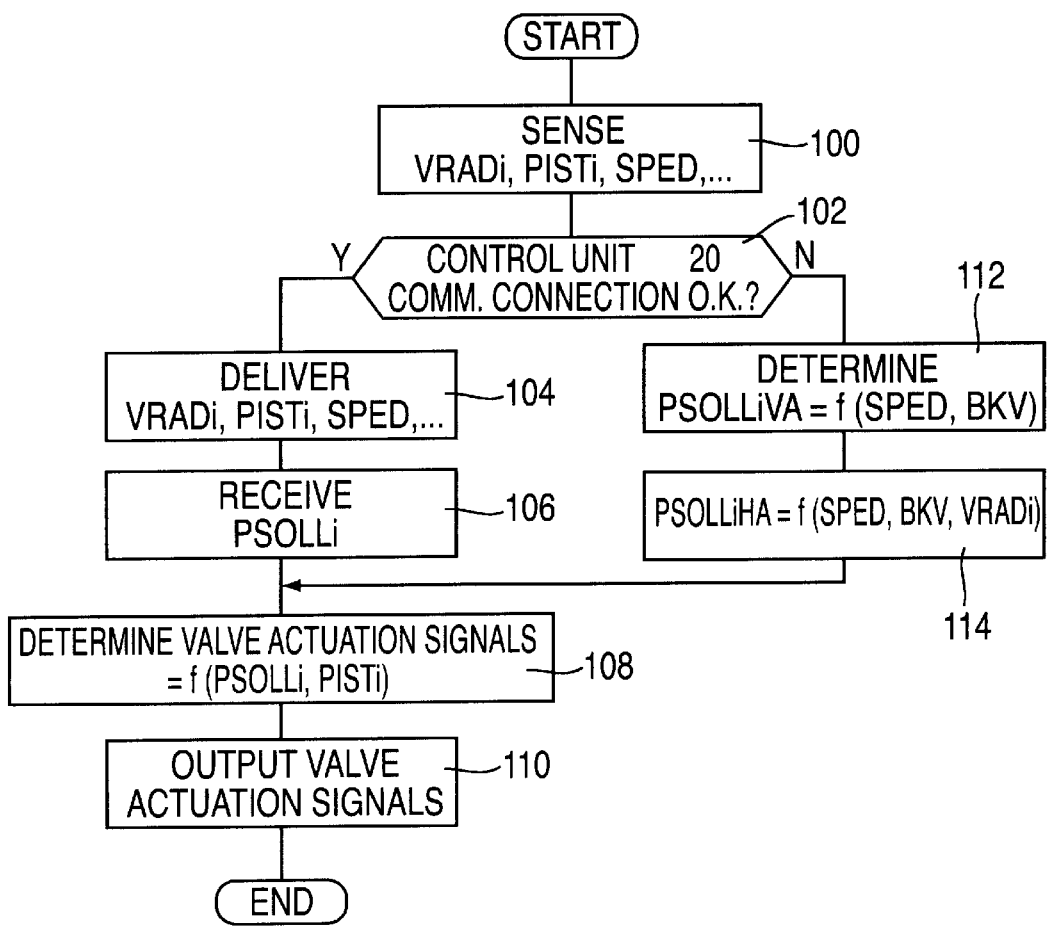
FIG. 2 shows a flow chart which represents an implementation of the emergency mode as a program of a calculation unit of the control unit that performs the actual brake regulation, according to the present invention.

This procedure is implemented, according to FIG. 2, in steps 112 and 114. In step 112, the setpoints PSOLLiVA of the front wheel brakes are determined on the basis of the driver's braking input and the predefined braking force distribution BKV (cf. characteristic curves in FIG. 3). In the subsequent step 114, the setpoints for the rear wheel brakes PSOLLiHA are then determined, also on the basis of the driver's braking input SPED, the predefined braking force distribution BKV, and optionally, in the context of the braking force distribution control system, on the basis of the wheel speeds VRADi. After step 114, the valve actuation signals are determined and output in accordance with steps 108 and 110.

What is claimed is:

1. A method of using a first control unit to control a braking system that includes a plurality of wheel brakes associated with a corresponding plurality of control elements, the method comprising the steps of:

receiving at the first control unit a plurality of reference variables for use in a setting operation at the plurality of wheel brakes;

producing a plurality of drive signals for the plurality of control elements as a function of the plurality of reference variables so that an actual value associated with each of the wheel brakes approaches a corresponding one of the plurality of reference variables;

determining a presence of a fault in which the plurality of reference variables are unavailable; and if the fault is determined to be present, the first control unit providing the plurality of reference variables in accordance with a predefined braking force distribution between a front axle and a rear axle.

2. The method according to claim 1, wherein a first plurality of wheels is provided on the front axle, wherein a second plurality of wheels is provided on the rear axle, and wherein after the presence of the fault is determined, the method further comprises the step of providing an electronic braking force distribution control system for limiting a speed deviation between the first plurality of wheels on the front axle and the second plurality of wheels on the rear axle as a function of a speed of each wheel of the first plurality of wheels and of the second plurality of wheels.

3. The method according to claim 1, wherein the predefined braking force distribution prevents an overbraking of the rear axle.

4. The method according to claim 1, wherein before the step of receiving at the first control unit the plurality of reference variables, the method further comprises the step of producing the plurality of reference variables in a second control unit in accordance with a function of at least one of an antilock braking system, an automatic slip control system, a vehicle dynamics control system, and a braking force distribution control system.

5. The method according to claim 4, wherein the fault corresponds to an emergency mode indicative of at least one of the second control unit and a communication connection with the second control unit being defective.

6. The method according to claim 4, wherein the first control unit checks a plurality of reference stipulations of the second control unit for plausibility.

7. The method according to claim 4, further comprising the steps of:

sensing at least one variable representing an actuation of one of the plurality of control elements by a driver; and performing one of the following steps:

transferring the at least one variable to the second control unit during a normal mode, and determining from the at least one variable a braking input of the driver for a braking force to be set at the plurality of wheel brakes, the braking input being delivered to the second control unit during the normal mode, and the braking input being analyzed during an emergency mode to determine the plurality of reference variables.

8. The method according to claim 1, wherein each reference variable corresponds to one of a reference pressure in one of the plurality of wheel brakes, a reference braking force, a reference torque, a reference wheel, and a reference slip adjusted within a corresponding control loop by an actuation of at least one of the plurality of control elements.

9. The method according to claim 1, wherein the braking system includes an electrically controlled hydraulic braking system.

10. The method according to claim 1, wherein if the fault is determined to be present, the method further comprises the steps of:

providing the predefined braking force distribution to signal the fault to a driver; and modifying a braking input delay characteristic.

11. An apparatus for controlling a braking system that includes a plurality of wheel brakes associated with a corresponding plurality of control elements, comprising:

a first control unit for controlling the braking system;

an arrangement for receiving a plurality of reference variables to control the plurality of wheel brakes;

an arrangement for producing a plurality of drive signals for the plurality of control elements as a function of the plurality of reference variables in order to set the plurality of reference variables at the plurality of wheel brakes; and an arrangement for detecting one of an absence of the plurality of reference variables and a fault in an area of the plurality of reference variables, wherein if one of the absence and the fault is present:

the first control unit provides a plurality of new reference variables in accordance with a predefined braking force distribution between a front axle and a rear axle, and the first control unit sets the plurality of new reference variables by actuating the plurality of control elements in order to control the braking system.

12. The apparatus according to claim 11, wherein the first control unit is coupled to a hydraulic unit of the braking system, the apparatus further comprising:

a second control unit; and a communication system coupled between the first control unit and the second control unit, wherein during a normal mode the first control unit receives the plurality of reference variables from the second control unit through the communication system.

* * * * *